United States Patent
Opsenica et al.

(10) Patent No.: US 12,052,217 B2
(45) Date of Patent: Jul. 30, 2024

(54) METHODS AND APPARATUS FOR SERVICE DISCOVERY

(71) Applicant: Telefonaktiebolaget LM Ericsson (publ), Stockholm (SE)

(72) Inventors: Miljenko Opsenica, Espoo (FI); Tero Kauppinen, Espoo (FI); Timo Simanainen, Veikkola (FI)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 17/594,951

(22) PCT Filed: May 3, 2019

(86) PCT No.: PCT/EP2019/061427
§ 371 (c)(1),
(2) Date: Nov. 3, 2021

(87) PCT Pub. No.: WO2020/224748
PCT Pub. Date: Nov. 12, 2020

(65) Prior Publication Data
US 2022/0294760 A1    Sep. 15, 2022

(51) Int. Cl.
*H04L 61/4511* (2022.01)
*H04L 61/4541* (2022.01)
*H04L 61/503* (2022.01)
*H04L 67/51* (2022.01)
*H04L 67/565* (2022.01)

(52) U.S. Cl.
CPC ...... *H04L 61/4511* (2022.05); *H04L 61/4541* (2022.05); *H04L 61/503* (2022.05); *H04L 67/51* (2022.05); *H04L 67/565* (2022.05)

(58) Field of Classification Search
CPC ............ H04L 61/4511; H04L 61/4541; H04L 61/503; H04L 67/51; H04L 67/565
See application file for complete search history.

(56) References Cited

U.S. PATENT DOCUMENTS

| 2004/0193700 A1* | 9/2004 | Westman | H04L 65/401 709/219 |
| 2009/0175265 A1* | 7/2009 | Lindgren | H04L 65/1069 455/445 |
| 2015/0142968 A1* | 5/2015 | Bhagwat | H04L 67/51 709/224 |

(Continued)

FOREIGN PATENT DOCUMENTS

KR    101894614 B1    9/2018

OTHER PUBLICATIONS

Michael P. Armijo et al., "Discovering LDAP Services with DNS," Feb. 20, 2002, 7 pages, Internet-Draft, draft-ietf-ldapext-locate-07.txt, The Internet Society.

(Continued)

*Primary Examiner* — Thomas J Dailey
(74) *Attorney, Agent, or Firm* — Nicholson De Vos Webster & Elliott LLP (57) ABSTRACT

A method and apparatus for providing service discovery. The method comprises receiving a service query; analysing the service query to determine whether the service query comprises a service name; and responsive to the service query comprising a service name, transmitting a service (SRV) record query to a Domain Name System (DNS).

20 Claims, 6 Drawing Sheets

(56) References Cited

U.S. PATENT DOCUMENTS

| | | |
|---|---|---|
| 2017/0279846 A1* | 9/2017 | Osterweil ........... H04L 63/1425 |
| 2019/0215229 A1 | 7/2019 | Seed et al. |
| 2021/0176167 A1* | 6/2021 | Shivananda ............ H04L 45/72 |

OTHER PUBLICATIONS

Anonymous, "dns—How can I read consul SRV records in my go application?," 2014, 2 pages, downloaded from https://stackoverflow.com/questions/23699140/how-can-i-read-consul-srv-records-in-my-go-application on Nov. 19, 2019.

A. Gulbrandsen et al., "A DNS RR for specifying the location of services (DNS SRV)," Feb. 2000, 13 pages, Network Working Group, RFC 2782, The Internet Society.

Fredrik Tolf et al., "2099-Support for SRV records in getaddrinfo," 2018, 5 pages, downloaded from https://sourceware.org/bugzilla/show_bug.cgi?id=2099 on Nov. 19, 2019.

International Search Report and Written Opinion for Application No. PCT/EP2019/061427, dated Nov. 27, 2019, 12 pages.

International Preliminary Report on Patentability, PCT App. No. PCT/EP2019/061427, Nov. 18, 2021, 9 pages.

* cited by examiner

METHODS AND APPARATUS FOR SERVICE DISCOVERY

CROSS-REFERENCE TO RELATED APPLICATIONS

This application is a National stage of International Application No. PCT/EP2019/061427, filed May 3, 2019, which is hereby incorporated by reference.

TECHNICAL FIELD

Embodiments described herein relate to method and apparatus for providing service discovery in a system.

BACKGROUND

Figure 1:
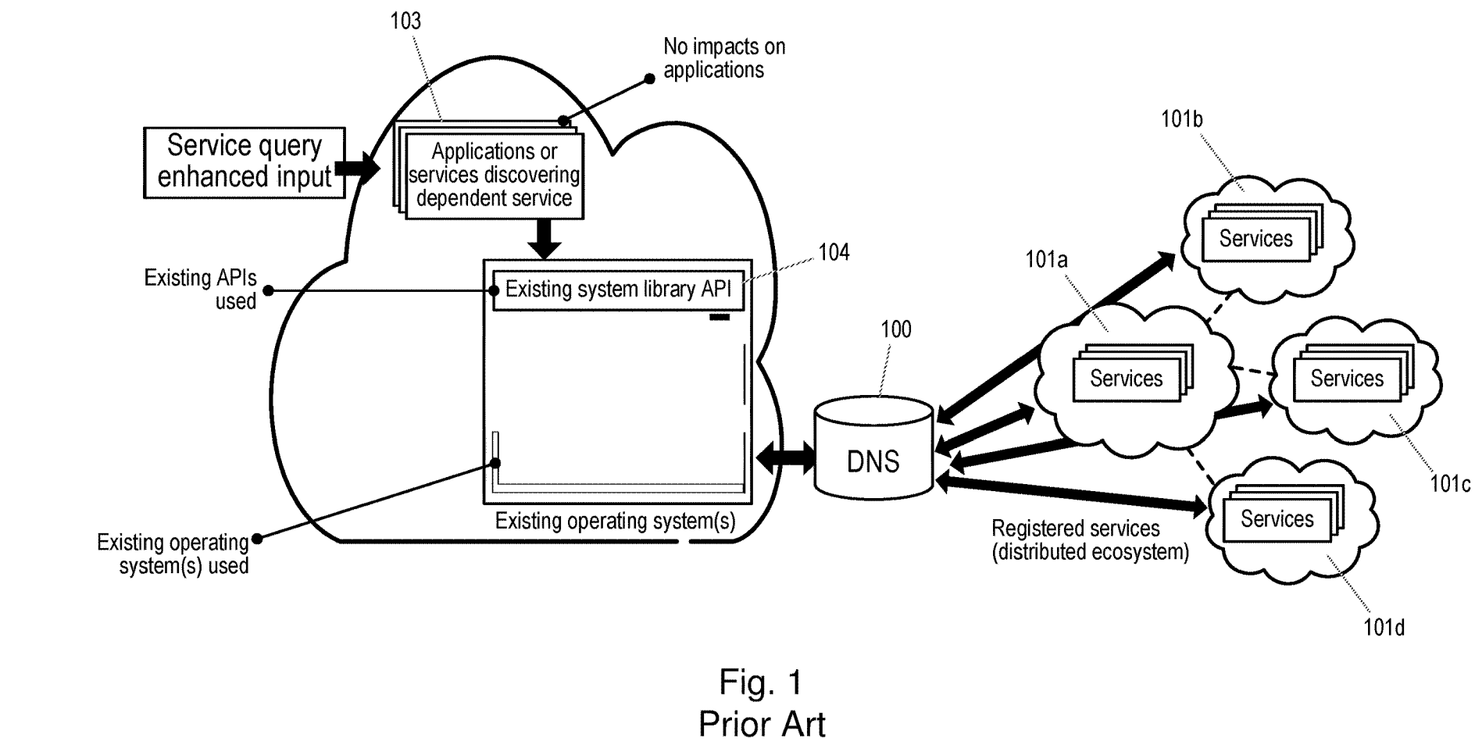
FIG. 1 illustrates a cloud based system for service discovery

FIG. 1 illustrates a cloud based system for service discovery. The DNS server 100 may be capable of supporting so-called service (SRV) records, which can store the location, i.e. the hostname and port number, of servers for specified services (101a to 101d).

The applications or services 103 discovering the dependent service may therefore be capable of providing a dedicated SRV record query to the DNS 100.

However, legacy applications may not be capable of providing a dedicated SRV query.

Current service discovery methods often utilize existing system libraries, e.g. library 104, which support limited discovery outputs for predefined services with predefined capabilities and access point ports. The predefined access ports are becoming a bigger limitation considering the current industry trends of an exponential growth in the number of services and service providers, and increased granularity of the new services with a lot of deviations in the offered capabilities and service options. In addition, the number of services is increasing even more with the usage of logical network isolations, where often the service access point is different from the base port of the service.

An application or service 103 that is discovering the dependent services 101a to 101d can implement adaptation mechanisms in the form of proprietary application specific discovery mechanisms. This is, however, complex and costly solution especially for a large number of existing, immutable legacy applications.

SUMMARY

According to some embodiments there is provided a method in a network function for providing service discovery. The method comprises receiving a service query; analysing the service query to determine whether the service query comprises a service name; and responsive to the service query comprising a service name, transmitting a service, SRV, record query to a Domain Name System, DNS.

According to some embodiments there is provided a network function for providing service discovery. The network function comprises processing circuitry configured to: receive a service query; analyse the service query to determine whether the service query comprises a service name; and responsive to the service query comprising a service name, transmit a service, SRV, record query to a Domain Name System, DNS.

According to some embodiments there is provided a computer program comprising instructions which, when executed on at least one processor, cause the at least one processor to carry out the method as described above.

According to some embodiments there is provided a computer program product comprising a computer-readable medium with the computer program as described above.

BRIEF DESCRIPTION OF THE DRAWINGS

For a better understanding of the embodiments, and to show how they may be put into effect, reference will now be made, by way of example only, to the accompanying drawings, in which:—

DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly, as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Embodiments described herein enhance existing service discovery solutions using the existing system libraries used for any application/service discovery. Additional functionality is added in between existing Application Programming Interfaces (APIs) and the system libraries to enhance the processing of the discovery search input, and to improve granularity of the discovery outputs.

The enhancement function does not impact the existing solutions and may be also added into the system library either via a library patch or via open source contribution to enhance the system library packages.

Embodiments described herein therefore provide an application agnostic solution, with minimal impact on the existing services, whilst enabling an enhanced discovery mechanism to support growing service exposure ecosystems.

Figure 2:
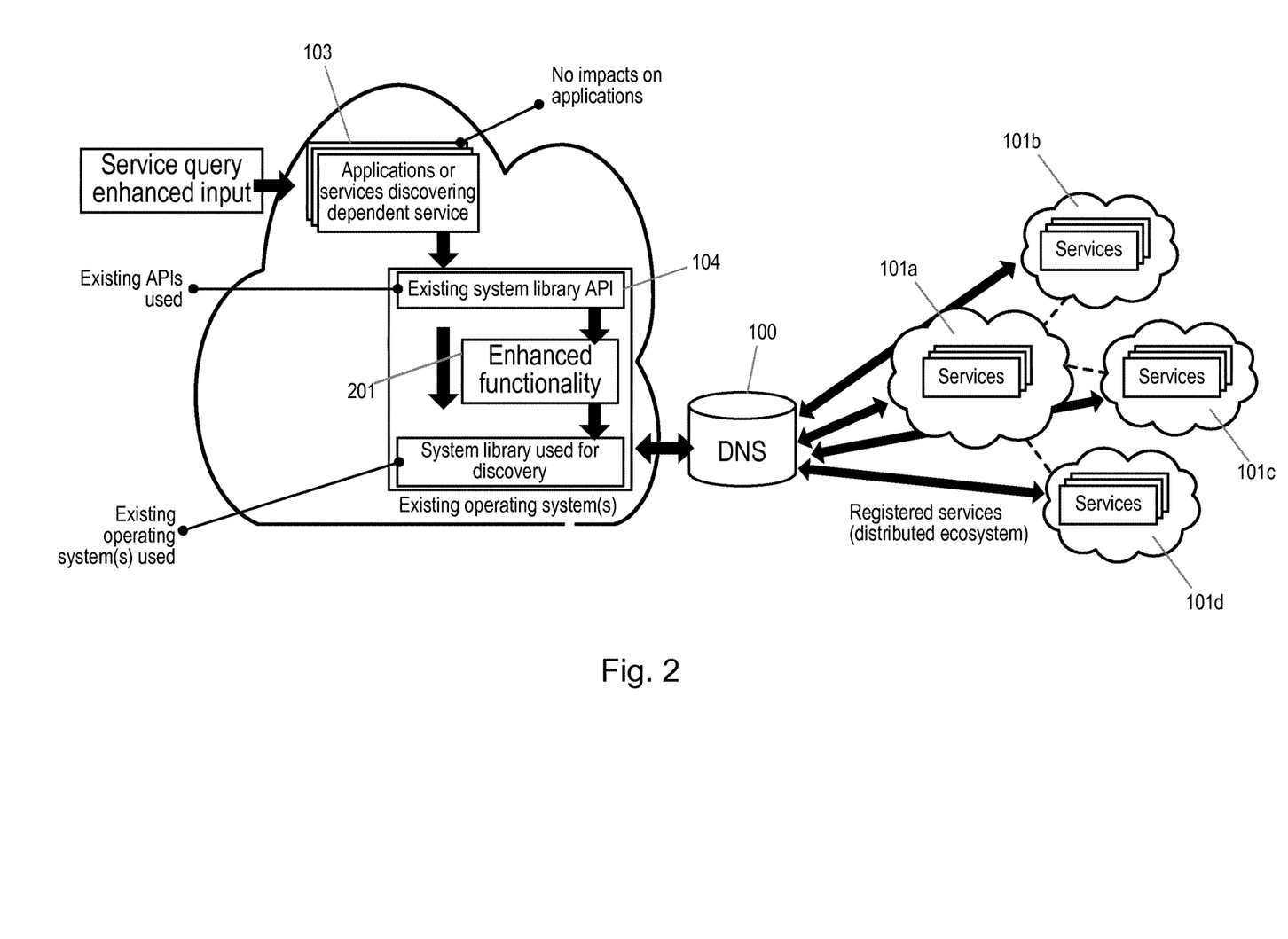
FIG. 2 illustrates a cloud based system for service discovery according to some embodiments.

FIG. 2 illustrates a cloud based system for service discovery according to some embodiments.

As in FIG. 1, the DNS server 100 may be capable of supporting so-called service (SRV) records, which can store the location, i.e. the hostname and port number, of servers for specified services (101a to 101d).

The applications or services 103 discovering the dependent service may therefore be capable of providing a dedicated SRV record query to the DNS 100.

The enhanced functionality 201, intercepts application's host lookups, and converts them as service lookups. This enhanced functionality 201 removes need for storing and mapping used ports with services usually happening in service aggregation components such as different types of repositories and orchestrators.

The enhancement functionality 201 also helps with the virtualization of services by allowing services to register their name and associate the name with the location of the service. The application 103 discovering the service only needs to know the service name in order to retrieve the location of the service. The same service name may be used for several instances of the same service, and the different instance of the service may be used to, for example, load-balance the service. Registering service instances with different a name or domain may help in implementing virtual hosting of the service.

Exponential grow of the available cloud services across distributed cloud domains may generate multiple service instances of the same type. There may therefore even be a number of instances in the same domain shared or isolated across different tenants, e.g. in the form of network slice. Multiple service instances may therefore be available in the same cloud domain. Differentiation of the access point for the service instance is, in that case, often based on the use of different ports. However, it is undesirable for the application 103 discovering the services and related hosts to handle such complexity. Instead it is preferable to allowing the underlying system to handle this complexity in general for all applications 103. This prevents the need for the applications 103 to have any additional proprietary implementations.

The enhancement functionality may be especially useful for an existing legacy application which is using the predefined ports for well-known services to discover the location of the services. In that case, applications can be easily adapted to use the heterogeneity of offered cloud services without impacting the application implementation.

Figure 3:
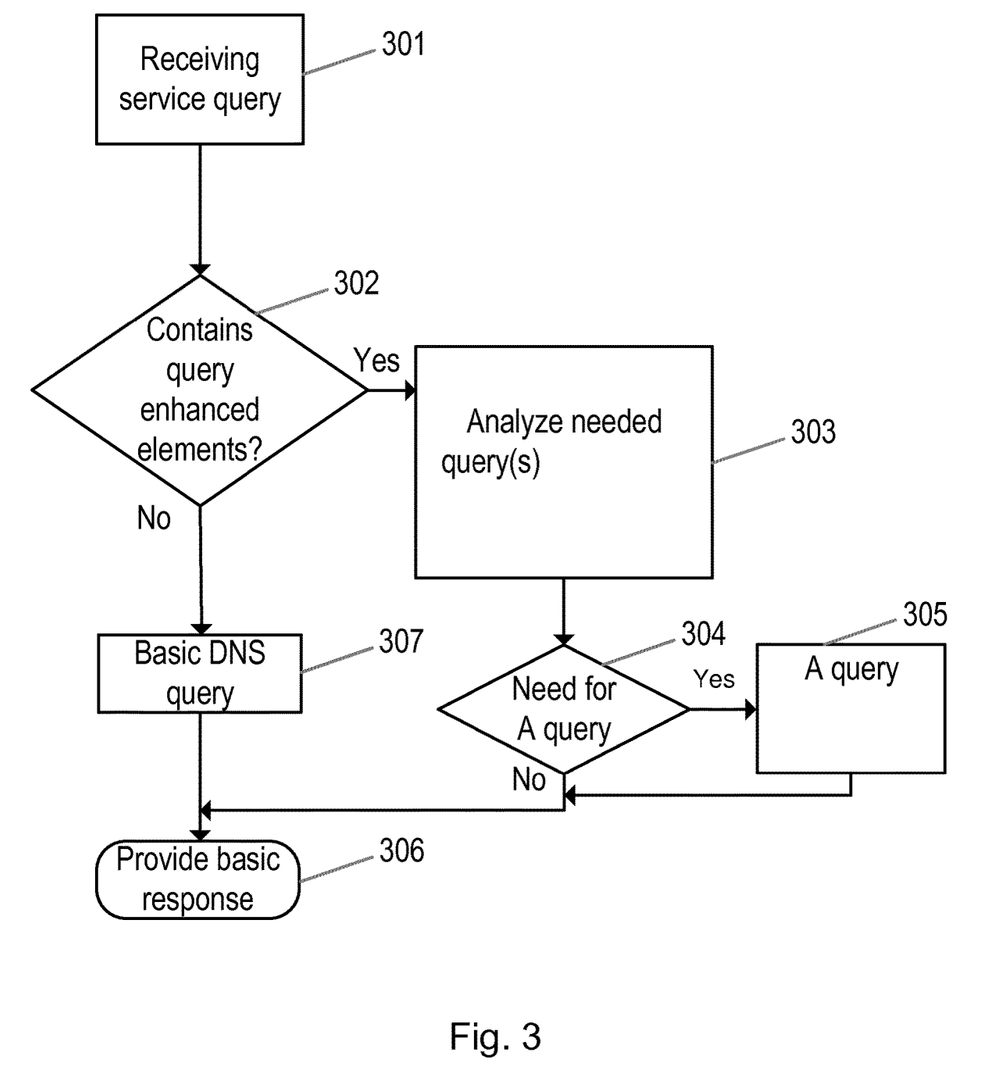
FIG. 3 illustrates a method for providing service discovery according to some embodiments.

FIG. 3 illustrates a method, in a network function, for example a system library comprising the enhancement functionality 201, for providing service discovery.

The method comprises in step 301, receiving a service query. The service query may comprise an SRV query, an A query (requesting an IPv4 address) or an AAAA query (requesting an IPv6 address). The service query may be received from an application.

In step 302, the method comprises analysing the service query to determine whether the service query comprises a service name. In other words, in step 302, the method determines whether the service query comprises an SRV query. For example, the method may comprise determining whether the service query contains query enhanced elements, for example, whether the service query is of a particular format. For example, the particular format may comprise using an SRV record notation as a host name (e.g. _service._proto.name). This format allows the application to encode the service and the host being queried in the same string without breaking interoperability with legacy applications.

If in step 302, the network function determined that the service query does comprise a service name, the method passes to step 303 which comprises transmitting a service, SRV, record query to a Domain Name System, DNS. Step 303 may comprise analysing what query is needed considering the service name.

In some embodiments, in step 304, the network function receives a service response to the service query wherein the service response comprises an indication of a port number and a name of a host. The network function then, analyses the service response to determine if a further query is required. For example, if the service response comprises an Internet Protocol (IP) address, then no further queries may be required. However, if the service response comprises a FQDN then a further query may be required.

If in step 304 the network function determines that a further query is required, the method passes to step 305 in which, the network function transmits a further query to the DNS. The further query may comprises an address query, for example an A query, or an A query followed by an AAAA query. The network function receives a response to the further query comprising an indication of an IP address.

The method then passes to step 306 in which the IP address received in response to the further query is transmitted to the application.

If in step 304 the network function determines that no further query is required, i.e. because the service response comprises an IP address, the method passes to step 306 in which the IP address received in the service response is transmitted to the application.

If in step 302, the network function determines that the service query does not comprise a service name, for example responsive to the service query comprising a fully qualified domain name (FQDN), the method passes to step 307 in which the network function transmits an address query, for example an A query (for IPv4) or an A query and an AAAA query (for IPv6), to the DNS. The network function receives a response to the address query comprising an indication of an IP address.

The method then passes to step 306 in which the IP address received in response to the address query is transmitted to the application.

In other words, the network function is designed to use the same API as a legacy library. When an application issues a service query, the enhancement functionality determines whether the service query comprises a FQDN or a service name. If a service name is detected, the query is directed to an enhanced library function which will issue an SRV query. If the query comprises an FQDN, a legacy function of the library will be called to generate an address query.

The IP address delivered in step 306 will have a similar structure regardless of the route taken to provide the IP address, so the receiving application does not need to differentiate these different routes.

For example, a legacy applications may use a FQDN for accessing a service. For example to connect to a mail server at smtp.example.com, the legacy application may use the query:

telnet smtp.example.com 25.

Telnet application is querying the IP address of smtp.example.com with an A query from DNS through a system library. The user of the application has to specify the port number (i.e. 25) of the smtp service. Alternatively the user can specify the service name in the command line. In this case the port number is read from the client services file (/etc/services) and has to be either a well-known service or preconfigured to client host, for example:
　　telnet smpt.example.com smtp.

However, in examples where the enhancement functionality as described herein is used, the user can connect with service name only, and the client host does not need any preconfigured information. Instead all the information that is needed to connect the to the service is queried from DNS: the service query from the user may therefore be, for example:
　　telnet_smtp._tcp.example.com.

In the DNS configuration, the entry for the service may be, for example:
　　_smtp._tcp.example.com. 3600 IN SRV 10 20 25 smtp1.example.com If load balancing is needed the same service may be registered to several locations, for example:
　　_smtp._tcp.example.com. 3600 IN SRV 10 20 25 smtp2.example.com
　　_smtp._tcp.example.com. 3600 IN SRV 10 20 25 smtp3.example.com Service registration can be done with the IP address:
　　_smtp._tcp.example.com. 3600 IN SRV 10 20 25 123.7.1.27

Figure 4A:
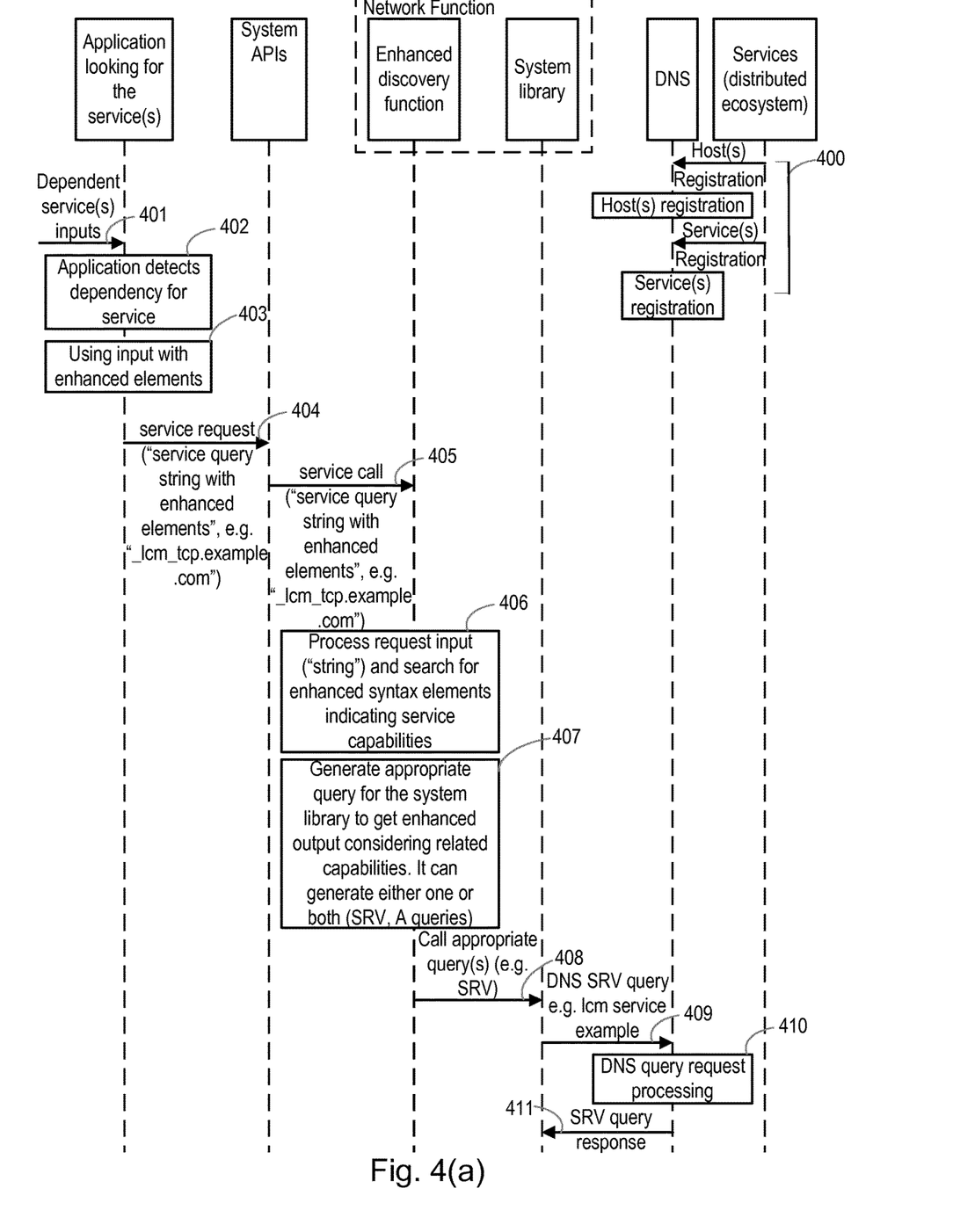
FIGS. 4a and 4b illustrates a signalling diagram according to some embodiments.
Figure 4B:
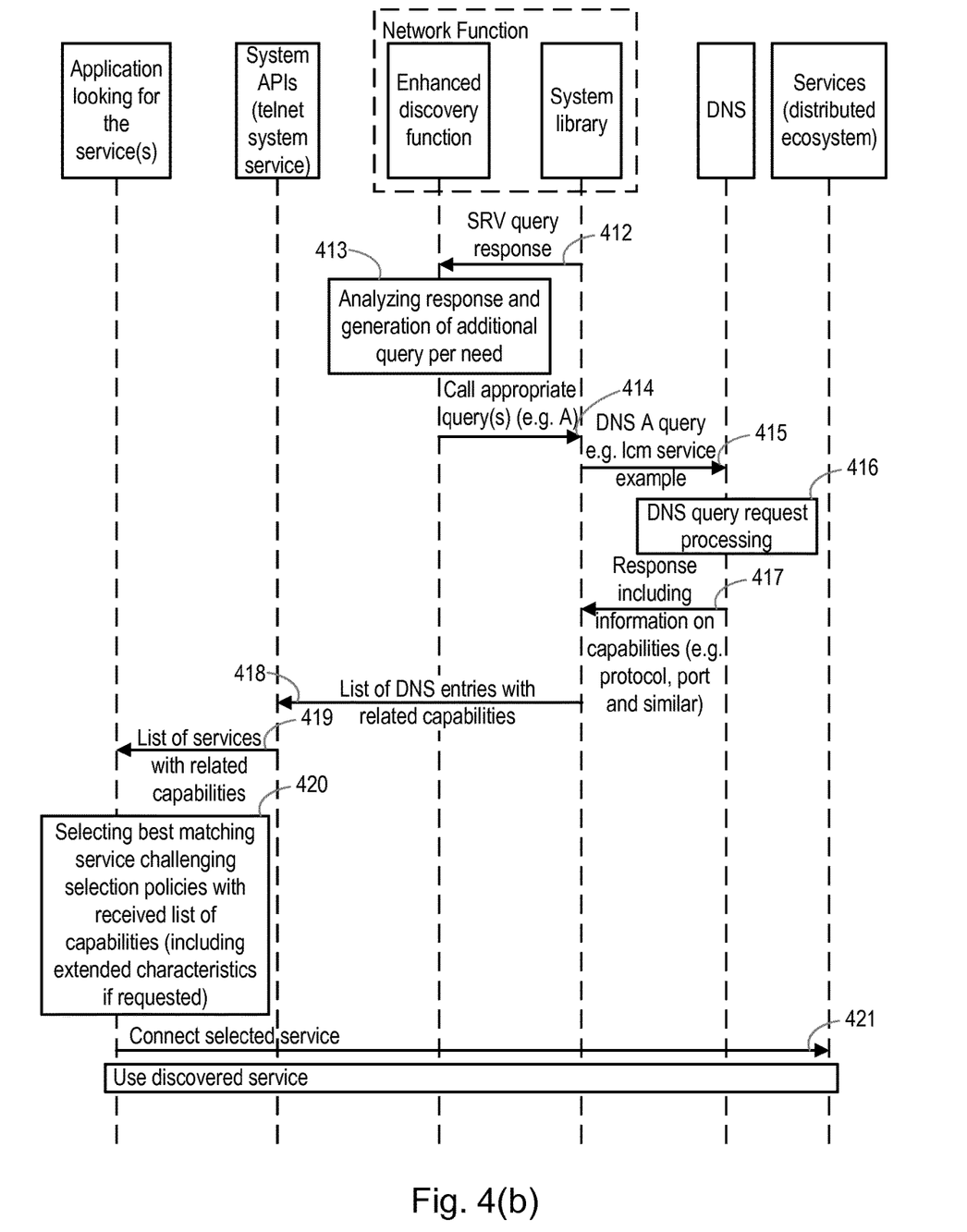

FIGS. 4a and 4b illustrates a signalling diagram according to some embodiments.

In step 400 the hosts and services in the distributed ecosystem register in the DNS. For example, a host may register it's A records (i.e. IPv4 and IPv6 addresses) to the DNS. A service may register SRV information (for example the FQDN and port number of the service).

In step 401, an Application receives inputs for at least one dependent service.

In step 402, the Application detects the dependency on the dependent service and in step 403 the Application determines whether the inputs comprise a service name.

In this example, the inputs comprise a service name and so in step 404, the Application generates a service query and transmits the service query to the system Application Programming Interface (API). In this example, the service query comprises a service name for example "_lcm_tp.example.com".

In step 405, the System API transmits the service query to the network function comprising the enhanced discovery function and the system library. It will be appreciated that the system library and enhanced discovery function may form part of the same network function. The enhanced discovery function then analyses the received service query in step 406 and searches for syntax elements indicating that the service query is an SRV query comprising a service name.

In step 407, the enhanced discovery function generates an appropriate query based on step 406. In this example, as the service query received comprises a service name, the enhanced discovery function calls an SRV query from the system library in step 408. It will be appreciated that in examples where the service query in step 404 comprises a FQDN or no service name, the enhanced discovery function may generate an A query or an AAAA query or both.

The system library transmits the SRV query in step 409. In step 410, the DNS processes the SRV query. In particular, the DNS searches for DNS entries matching the service name in the SRV query.

In step 411, the DNS transmits the SRV query response to the system library. The system library forwards the SRV query response to the enhanced discovery function in step 412. The SRV response may comprise IP addresses from DNS entries matching the service name in the SRV query, or may comprise FQDNs from DNS entries matching the service name in the SRV query.

In step 413, the enhanced discovery function analyses the SRV query response and determines whether a further query is required. As described above if the SRV query response comprises an IP address, then no further query may be required. In this example however, the SRV query response comprises one or more FQDNs. Therefore in step 414, the enhanced discovery function calls an A query from the system library.

In step 415, the system library transmits the A query to the DNS.

In step 416, the DNS processes the A query and transmits a response to the A query to the system library in step 417 comprising at least one IP address of a DNS entry. The response to the A query may also comprise information on capabilities of the service in the DNS entry, for example protocol, port or similar.

The system library may then forward the response to the A query to the system API in step 418. In step 419, the System API may forward the response to the A query to the Application.

In step 420, the Application may select a best matching service from the received response to the A query, for example, based on selection policies.

In step 421, the Application may connect to the selected service using the IP address associated with that service in the response to the A query.

Implementation of the enhancement to the discovery process may be achieved using at least three different approaches. The choice of approach may depend on the operating environment and it should be noted that all three approaches are not necessarily available or adequate in every environment. Implementation alternatives are ordered in consideration of usage maturity and level of impact to the current industries. More mature alternatives impact more existing industry but improve user experience.

In a first approach, the enhancement functionality may be implemented with an adaption layer that is deployed on the top of a system library, which provides address resolution functionality for the applications. In Unix-like systems, for example, such an adaptation layer can be inserted by using a dynamic linker.

A second approach is implementing the enhancement functionality as a patch for the system library. Such an approach naturally creates a tight dependency relation between the patch and the system library, i.e. if the system library is updated, the patch may need an update and must be re-applied.

For a third approach, the system library package itself is upgraded, and possibly released as an open source contribution. In this case, the enhancement functionality may be part of the system package and may in this way be distributed to desired network functions.

Figure 5:
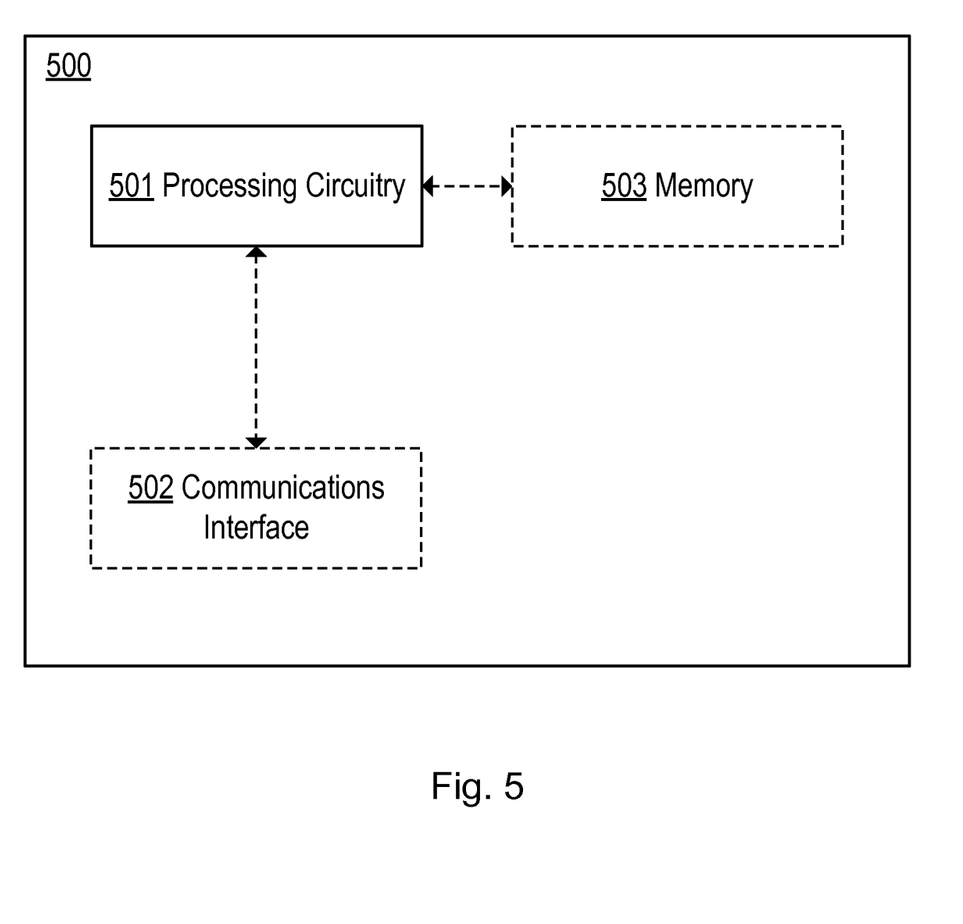
FIG. 5 illustrates a network function comprising processing circuitry (or logic).

FIG. 5 illustrates a network function 500 comprising processing circuitry (or logic) 501. The processing circuitry 501 controls the operation of the network function 500 and can implement the method described herein in relation to an network function 500. The processing circuitry 501 can comprise one or more processors, processing units, multi-core processors or modules that are configured or programmed to control the network function 500 in the manner described herein. In particular implementations, the processing circuitry 501 can comprise a plurality of software and/or hardware modules that are each configured to perform, or are for performing, individual or multiple steps of the method described herein in relation to the network function 500.

Briefly, the processing circuitry 501 of the network function 500 is configured to: receive a service query; analyse the service query to determine whether the service query comprises a service name; and responsive to the service query comprising a service name, transmit a service, SRV, record query to a Domain Name System, DNS.

In some embodiments, the network function 500 may optionally comprise a communications interface 502. The communications interface 502 of the network function 500 can be for use in communicating with other nodes, such as other virtual nodes. For example, the communications interface 502 of the network function 500 can be configured to transmit to and/or receive from other nodes requests, resources, information, data, signals, or similar. The processing circuitry 501 of the network function 500 may be configured to control the communications interface 502 of the network function 500 to transmit to and/or receive from other nodes requests, resources, information, data, signals, or similar.

Optionally, the network function 500 may comprise a memory 503. In some embodiments, the memory 503 of the network function 500 can be configured to store program code that can be executed by the processing circuitry 501 of the network function 500 to perform the method described herein in relation to the network function 500. Alternatively or in addition, the memory 503 of the network function 500, can be configured to store any requests, resources, information, data, signals, or similar that are described herein. The processing circuitry 501 of the network function 500 may be configured to control the memory 503 of the network function 500 to store any requests, resources, information, data, signals, or similar that are described herein.

The embodiments described herein simplify application service discovery by introducing generic enhancement of the system host discovery mechanisms without impacts on the querying application. The embodiments described herein remove implementation requirements on proprietary solutions for more granular service discovery (addressing growing number of distributed cloud services).

The embodiments described herein are applicable for all service discovery use cases including, for example, modern web browsers cases with a similar limitation on more granular service discovery without knowing service ports.

The embodiments described herein also enable a long term solution for the light patching of the used system libraries. Embodiments described herein also enable enhanced edge services exposure and distributed cloud solutions where services can be more easily distributed and discovered across a multitude of cloud domains. Furthermore, embodiments described herein decrease the complexity and cost of service discovery implementations.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a network function for providing service discovery, the method comprising:
   receiving a service query at the network function having a functionality to process a fully qualified domain name (FQDN) to access a location for a service via a Domain Name System (DNS) and an enhanced functionality to access the service by use of a service name to identify the service;
   analysing the service query to determine whether the service query comprises the service name;
   when the service query comprises the service name, employing the enhanced functionality for the service query based on the service name, otherwise employing the functionality to process the FQDN; and
   responsive to the service query comprising the service name, determining, by the enhanced functionality, a service record query based on the service name and transmitting the service record query to the DNS.

2. The method of claim 1 further comprising:
   responsive to the service query comprising the FQDN for the location for the service when the service name is not present, transmitting an address query to the DNS.

3. The method of claim 2 wherein the address query comprises an A query or an A query followed by an AAAA query.

4. The method of claim 1, wherein the analysing further comprises determining whether the service query comprises a string of a first format to identify use of the enhanced functionality to access the service.

5. The method of claim 4 wherein the first format comprises using an SRV record notation as a host name to identify use of the enhanced functionality to access the service.

6. The method of claim 1 further comprising for the enhanced functionality:
   receiving a service response to the service record query wherein the service response comprises an indication of a port number and a name of a host.

7. The method of claim 6 further comprising:
   analysing the service response to determine if a further query is required.

8. The method of claim 7 further comprising:
   responsive to determining that a further query is required, transmitting a further query to the DNS.

9. The method of claim 7 wherein the further query comprises an address query.

10. The method of claim 9 further comprising receiving a response to the further query comprising an indication of an Internet Protocol address.

11. A network function for providing service discovery, the network function comprising:
    processing circuitry; and
    a memory comprising program code which, when executed by the processing circuitry, causes the network function to:
    receive a service query at the network function having a functionality to process a fully qualified domain name (FQDN) to access a location for a service via a Domain Name System (DNS) and an enhanced functionality to access the service by use of a service name to identify the service;
    analyse the service query to determine whether the service query comprises the service name;
    when the service query comprises the service name, employ the enhanced functionality for the service query based on the service name, otherwise employ the functionality to process the FQDN; and responsive to the service query comprising the service name, determine, by the enhanced functionality, a service record query based on the service name and transmit the service record query to the DNS.

12. The network function of claim 11 wherein the network function is further to:

responsive to the service query comprising the FQDN for the location for the service, when the service name is not present, transmit an address query to the DNS.

13. The network function of claim 12 wherein the address query comprises an A query or an A query followed by an AAAA query.

14. The network function of claim 11, wherein network function is to perform the analysing by determining whether the service query comprises a string of a first format to identify use of the enhanced functionality to access the service.

15. The network function of claim 14 wherein the first format comprises using an SRV record notation as a host name to identify use of the enhanced functionality to access the service.

16. The network function of claim 11, wherein the enhanced functionality of the network function is further to:

receive a service response to the service record query wherein the service response comprises an indication of a port number and a name of a host.

17. The network function of claim 16, wherein the enhanced functionality of the network function is further to:

analyse the service response to determine if a further query is required.

18. The network function of claim 17 wherein the enhanced functionality of the network function is further to:

responsive to determining that a further query is required, transmit a further query to the DNS.

19. The network function of claim 18 wherein the further query comprises an address query.

20. The network function of claim 19, wherein the enhanced functionality of the network function is further to receive a response to the further query comprising an indication of an Internet Protocol address.

* * * * *